United States Patent
Goldsberry

(10) Patent No.: US 8,313,137 B2
(45) Date of Patent: Nov. 20, 2012

(54) FRONT BUMPER FACE

(75) Inventor: Nicholas Goldsberry, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 52 days.

(21) Appl. No.: 12/331,014

(22) Filed: Dec. 9, 2008

(65) Prior Publication Data

US 2009/0243340 A1    Oct. 1, 2009

Related U.S. Application Data

(60) Provisional application No. 61/040,841, filed on Mar. 31, 2008.

(51) Int. Cl.
B60R 19/44    (2006.01)

(52) U.S. Cl. ............. 296/191; 296/187.09; 296/193.09; 293/133; 293/155; 29/460

(58) Field of Classification Search ............. 296/193.09, 296/203.02, 191, 187.01; 293/155, 132, 293/102, 133, 108, 117
See application file for complete search history.

(56) References Cited

U.S. PATENT DOCUMENTS

| | | | |
|---|---|---|---|
| 3,486,481 A * | 12/1969 | Stout et al. | 118/503 |
| 5,226,695 A * | 7/1993 | Flint et al. | 296/191 |
| 5,301,411 A | 4/1994 | Fujiwara et al. | |
| 5,533,780 A * | 7/1996 | Larson et al. | 296/203.02 |
| 5,707,450 A | 1/1998 | Thompson | |
| 6,036,779 A | 3/2000 | Tolbert | |
| 6,164,807 A | 12/2000 | Gerstner et al. | |
| 6,386,624 B1 * | 5/2002 | Schultz et al. | 296/193.1 |
| 6,880,882 B2 * | 4/2005 | Andre et al. | 296/193.09 |
| 7,097,239 B2 * | 8/2006 | Lazzeroni | 296/203.01 |
| 7,641,267 B2 * | 1/2010 | Makino | 296/193.1 |
| 2006/0156547 A1 * | 7/2006 | Tarahomi | 29/897.2 |
| 2007/0266541 A1 * | 11/2007 | Sufczynski et al. | 29/460 |

FOREIGN PATENT DOCUMENTS

| | | |
|---|---|---|
| DE | 37 22 869 C1 | 1/1989 |
| DE | 3722869 | 1/1989 |
| EP | 0703008 | 3/1996 |
| EP | 1512582 | 3/2005 |
| JP | 2005-271626 A | 10/2005 |

OTHER PUBLICATIONS

English translation of EP 1 512 582 A1 (EP 1 512 582 A1 and English abstract submitted in IDS dated Apr. 21, 2011).
English translation of EP 0 703 008 A2 (EP 0 703 008 A2 and English abstract submitted in IDS dated Apr. 21, 2011).
Supplementary European Search Report of European Patent Application No. 09727205.8 dated Apr. 13, 2011.

* cited by examiner

*Primary Examiner* — Glenn Dayoan
*Assistant Examiner* — Sunsurraye Westbrook
(74) *Attorney, Agent, or Firm* — Mark E. Duell; Rankin Hill & Clark LLP

(57) ABSTRACT

A system and method for temporarily attaching an accessory component such as a fog light cover, to a vehicle body panel prior to a painting operation are described. The system and method eliminate the need for jigs or other support structures typically used to support the accessory during painting of the accessory and body panel.

20 Claims, 3 Drawing Sheets

FRONT BUMPER FACE

FIELD OF THE INVENTION

The present invention relates to a vehicle body panel such as a front bumper face, and a related method involving the panel, that eliminates the requirement for a painting jig for accessories that are typically concurrently painted with the body panel and subsequently installed on the panel after painting of the accessory and the panel.

BACKGROUND OF THE INVENTION

Vehicular accessories that attach to a vehicle and typically, a body panel of a vehicle are well known. Examples of such accessories include, but are not limited to, trim strips, moldings, frames for lighting elements, splash guards, running boards, mirror housings, and aerodynamic components such as air dams, spoilers, and the like. Typically these accessories are designed as removable components and thus are not integrally formed with the vehicle body panel of interest. For example, it may be desired to enable the accessory to be easily removable, such as for vehicle lighting elements to enable the lighting element to be replaced.

Frequently, it is desired to provide the accessory or other component with an exterior having the same color as the vehicle or a particular exterior portion of the vehicle. Accordingly, it is necessary or at least preferred, to paint that accessory or component the same color as the vehicle or exterior portion thereof. As will be appreciated by those skilled in the art, it is difficult to achieve a match between painted components particularly if the components are painted from different sources of paint, painted at different times, and/or painted under different conditions. As a result, painting operations typically use one or more jigs or other support structures to support the accessory alongside the vehicle so that the accessory can be painted at the same time as the vehicle or vehicle panel to which the accessory will be subsequently attached. Artisans have developed numerous designs for such jigs or support structures such as described in U.S. Pat. Nos. 6,036,779 and 5,707,450. In addition, U.S. Pat. No. 5,301,411 describes a complex vehicle painting and assembly system that utilizes numerous jigs for holding components during painting.

Although satisfactory in many respects, the use of such jigs increases the amount of floor space needed in a painting facility such as a paint booth. And, stocking the relatively large number of such jigs required in a large scale vehicle painting operation increases costs and time requirements in using, maintaining, and eventually repairing or replacing such jigs.

Recognizing the desirability in painting all vehicle body components in the same operation and using the same paint source, a technique and assembly was described in U.S. Pat. No. 3,486,481 which attempted to eliminate separate stand-alone painting jigs. The '481 patent describes an apparatus for temporarily supporting vehicle body panels during painting. The apparatus attaches to a main portion of the vehicle and the body panel of interest prior to painting. The apparatus enables the body panel to be moved to a variety of different positions during painting while the panel is attached to the vehicle.

Although the strategy of the '481 patent would likely eliminate the need for separate stand alone painting jigs for certain large body panels, the method of the '481 patent still requires significant assembly and removal operations associated with the support apparatus. And, the strategy of the '481 patent still requires a support apparatus, although it does not occupy valuable floor space. In addition, it would be expected that corresponding costs would also be associated with the support apparatuses. Accordingly, a need remains for a system and method by which vehicle accessories or components can be supported without the use of a separate jig or support apparatus while they are painted, preferably during the same painting operation as the vehicle to which they are subsequently attached.

SUMMARY OF THE INVENTION

The difficulties and drawbacks associated with previous-type systems are overcome in the present method and apparatus for a body panel having provisions for temporarily engaging an accessory component so that the panel and the component can be painted together.

In one aspect, the present invention comprises a vehicle body panel comprising a panel defining a first region for installation engagement of a removable accessory. The panel includes at least one fastener element in the first region adapted to engage a corresponding fastener element of the accessory. The panel also defines a second region for temporary engagement of the accessory. The panel also includes at least one fastener element in the second region adapted to temporarily engage a corresponding fastener element of the accessory.

In another aspect, the present invention provides a vehicle body panel and accessory assembly. The assembly comprises a vehicle accessory including at least one fastener element. The assembly also includes a vehicle panel defining a first region and a second region. The panel includes (i) a first fastener element in the first region adapted for installation engagement with the at least one fastener element of the accessory, and (ii) a second fastener element in the second region adapted for temporary engagement of the at least one fastener element of the accessory.

In yet another aspect, the present invention comprises a method of supporting an accessory component while painting the component and a vehicle panel to which the component is to be subsequently engaged. The method comprises providing a vehicle panel having a first fastener element and a second fastener element, each element adapted to engage an accessory component. The method also comprises providing an accessory component adapted to engage the first and second fastener elements of the vehicle panel. The method additionally comprises temporarily engaging the accessory component to the first fastener element of the vehicle panel prior to painting. The method further comprises painting the vehicle panel and the accessory temporarily engaged thereto. After painting of the vehicle panel and the accessory component, the accessory component is disengaged from the first fastener element of the vehicle panel. The method then comprises engaging the accessory component to the second fastener element of the vehicle panel.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

The present invention provides a system and related method that include a vehicle body panel and one or more accessories that are subsequently installed with the body panel after painting of the body panel and the accessories. Although the present invention includes a wide array of vehicle body panels, for purposes of describing the present invention, the panel shown in the accompanying drawings is depicted as a front bumper panel. The present invention provides a vehicle body panel having provisions to temporarily retain one or more accessories to be installed or otherwise affixed to the panel after a painting operation. The accessories can be temporarily attached to the panel at a region different than that at which the accessories are to be finally installed, so that during painting, the accessories can be painted at the same time, and from the same source of paint as the body panel, without the requirement of any support structures such as painting jigs. After painting the body panel and the accessories temporarily attached thereto, once dried or sufficiently cured so that they may be handled, the accessories are removed and installed in their various designated regions on the panel.

Before turning attention to the preferred embodiments of the present invention, it is instructive to consider various terms used herein. The terms "installation engagement" and "temporary engagement" are periodically used herein to refer to two different modes of attaching a vehicle accessory or component to a vehicle such as a body panel of the vehicle. Installation engagement refers to a secure attachment in which the accessory is retained in its final, as-installed position relative to the body panel. Temporary engagement refers to a state of attachment in which the accessory, although retained and supported on the panel, can be readily removed therefrom. Typically, temporary engagement is such that the accessory is not entirely received or otherwise positioned within a receiving region defined in the panel.

Figure 1:
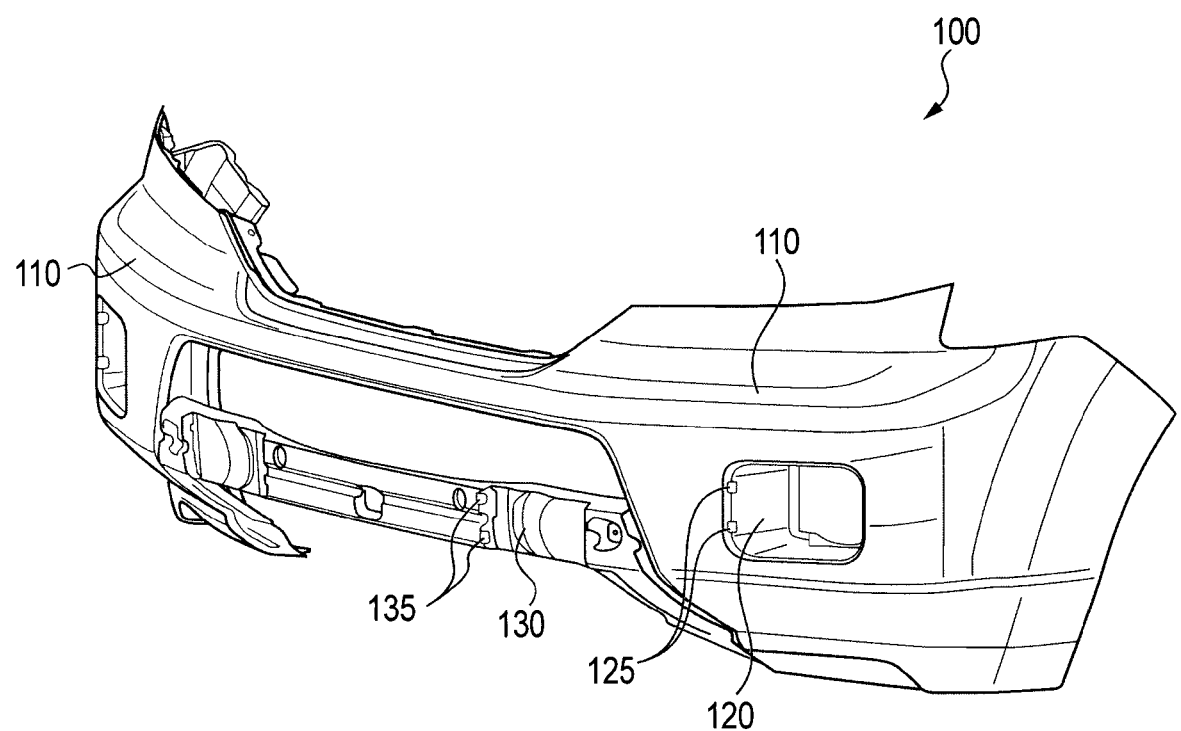
FIG. 1 illustrates a preferred embodiment front bumper panel in accordance with the present invention.

FIG. 1 shows the general configuration of a front bumper panel, which is an example of a vehicle body panel to which the present invention is directed. Specifically, FIG. 1 depicts a preferred embodiment front bumper panel 100 having a front face 110. The front face 110 in its final form, receives one or more coatings of paint. The bumper panel 100 defines an accessory receiving region 120, and includes one or more fastener elements 125 for use in engaging an accessory to the panel at that region 120. The receiving region 120 preferably includes a recessed region for receiving the accessory. In the present description, a representative accessory is described herein as a lighting assembly which includes a housing that retains a light emitting element, and a cover plate extending over the front face of the housing. One or more components of the lighting assembly are painted to match the exterior color of the vehicle. In its final installation in the front bumper panel 100, the lighting assembly is disposed in the receiving region 120. The bumper panel 100 also defines an accessory temporary receiving region 130, and includes one or more fastener elements 135 generally in or around that region for use in temporarily engaging the accessory to the panel at that region 130. The temporary receiving region 130 preferably includes a recessed region for receiving the accessory. In the present description, as described in greater detail herein, the temporary receiving region 130 and its associated fastener elements serve to temporarily receive and retain the lighting assembly.

Figure 2:
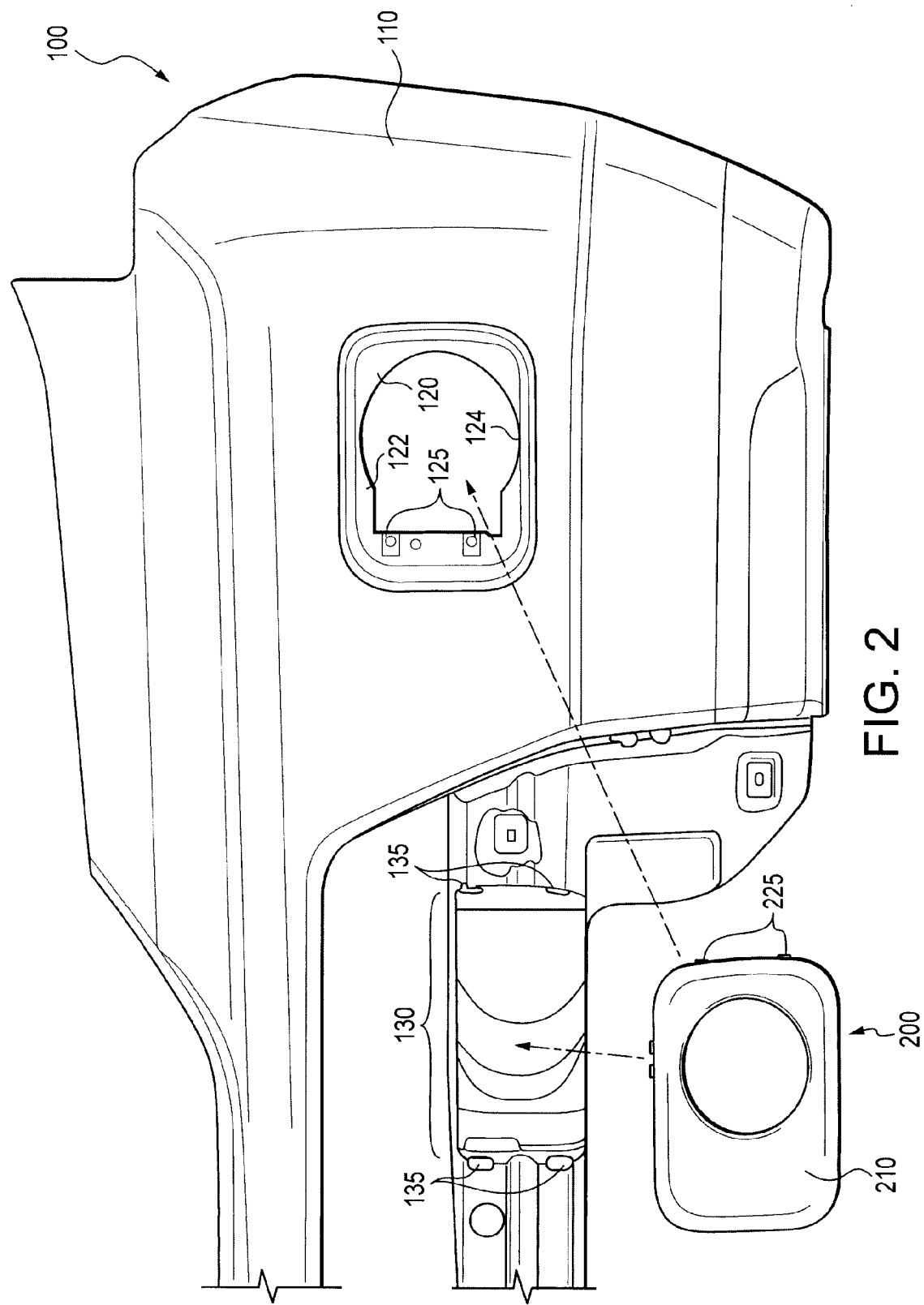
FIG. 2 illustrates a preferred embodiment assembly including the front bumper panel of FIG. 1 and an accessory such as a light cover to be engaged therewith in accordance with the present invention.

FIG. 2 is an illustration of a preferred embodiment system in accordance with the present invention comprising the bumper panel of FIG. 1 and a cover or faceplate 200, such as a fog light cover. The accessory receiving region 120 defined in the bumper panel 100 is adapted to fittingly receive the faceplate 200. In addition, the receiving region 120 may also include one or more recessed supporting elements 122 that serve to support and contact a lighting element (not shown) that may be received within the receiving region 120. The receiving region 120 may also define one or more apertures such as aperture 124 that extend through the panel 100 and allow the lighting element to be flush or recessed with respect to the exterior surface of the front face 110 of the bumper panel 100. The one or more apertures may also serve to provide access to the rear of the lighting element, for instance to enable repair or maintenance of the lighting element while installed in the panel, without removal of the lighting element from the panel 100. Preferably disposed along the periphery of the receiving region 120 are the fastener elements 125. As explained in greater detail herein, the type and arrangement of the fastener elements 125 correspond to the fastener elements provided for the faceplate 200.

FIG. 2 also illustrates an example of a preferred embodiment faceplate 200 for subsequent final installation in the body panel, at region 120. As noted, the faceplate 200 is depicted as a fog light cover. The faceplate 200 defines a front face 210 that includes an exterior surface or region. That exterior surface or region, or a portion thereof, will in its final form, receive one or more coatings of paint. The faceplate 200 includes one or more fastener elements 225 which are described in greater detail herein.

FIG. 2 further illustrates the accessory temporary receiving region 130, and the one or more fastener elements 135 provided generally in or around that region for use in temporarily engaging the faceplate to the panel at that region 130. As described in greater detail herein, the temporary receiving region 130 is preferably defined at or along a portion of the body panel 100 that will not be visible upon final installation of the panel in the vehicle of interest. However, the present invention includes the use of temporary receiving regions that are defined in regions of a body panel that are or will be visible upon final installation. The temporary receiving region 130 may be in any region or portion of the panel 100 and can be along any face, such as a front face which will be exposed to the exterior upon final installation, or a rear face which will not be exposed upon final installation of the panel. Most preferably, the temporary receiving region 130 is defined along a portion of the panel 100 such that the region 130 will not be readily viewable or otherwise exposed to view upon final installation of the panel in the vehicle of interest. Also, it is generally preferred that the region 130 be relatively close to the accessory receiving region 120 defined in the panel 100 so as to reduce the amount of travel of the faceplate 200 when transferring it from the temporary receiving region 130 to the final installation region 120.

Figure 3:
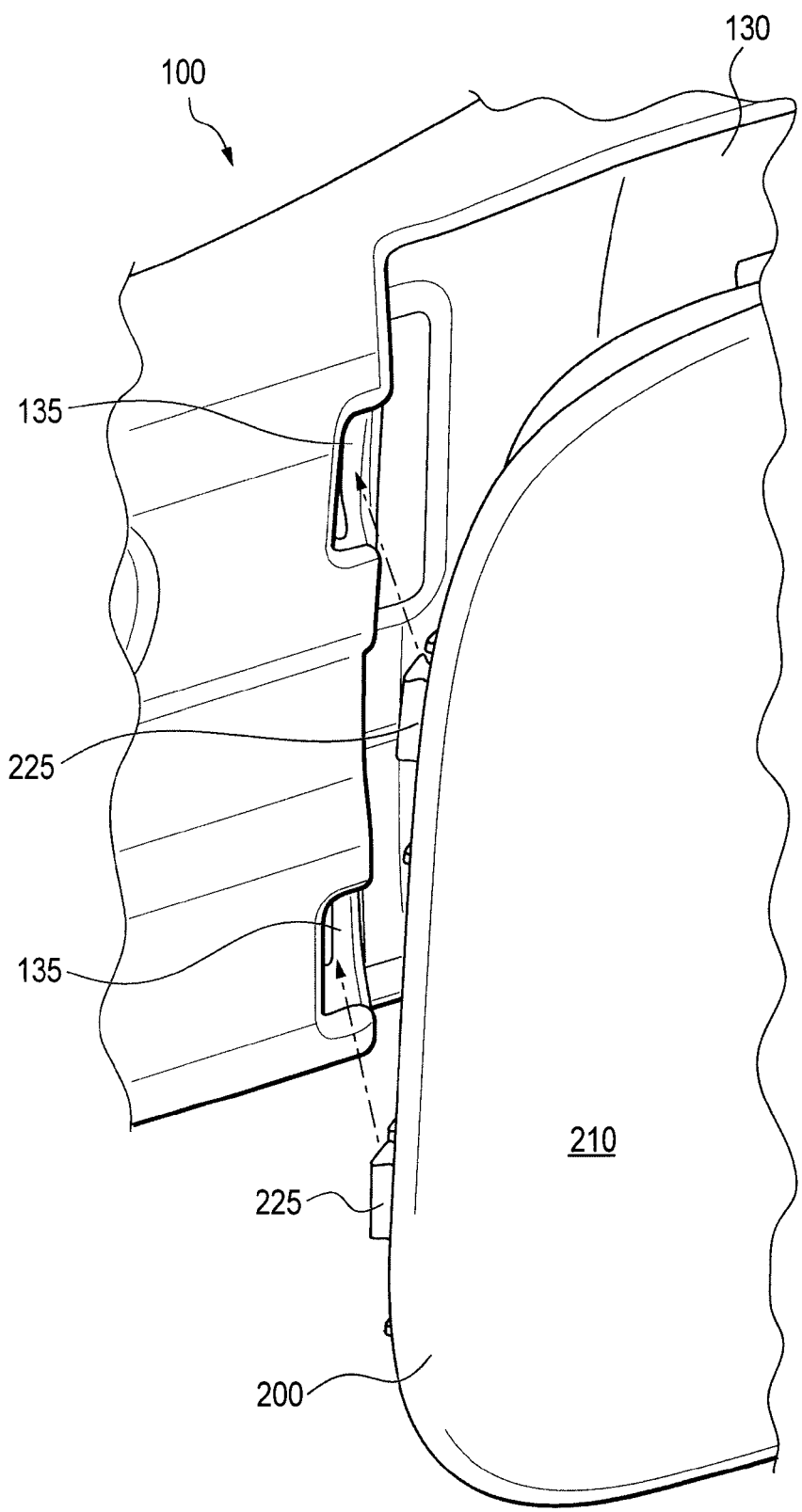
FIG. 3 is a detailed view of the assembly of FIG. 2 illustrating a region of the bumper panel at which the accessory is temporarily engaged.

FIG. 3 is a detailed view of the assembly of FIG. 2 illustrating the temporary receiving region 130 of the bumper panel 100 at which the faceplate 200 is temporarily engaged therewith. The one or more fastener elements 135 of the temporary receiving region 130 are evident. These fastener elements 135 are adapted to engage with one or more fastener elements 225 provided on the faceplate 200, and preferably along a rear region or face of the faceplate. This configuration enables the front face 210 of the faceplate 200 to be oriented outward so that the exterior surface of the front face can receive paint during a painting operation.

The fastener elements 135 used in the temporary receiving region 130 and the fastener elements 125 in the receiving region 120 can independently be of any type typically used in the automotive arts for attaching accessories to body panels. For example, the fastener elements can be in the form of threaded fasteners such as bolts and screws; clamps; clasps; clips; peg and receiving members; rivots; pins such as clevis pins or cotter pins; retaining rings; bands of elastic material; snap engagement members; straps; staples; tacks; miscellaneous ties; hook and loop fasteners; and zipper type fasteners. It is also contemplated that for certain applications, adhesives could be used to temporarily attach the faceplate 200 to the panel of interest. Preferably, the fastener elements in both the receiving regions in the body panel of interest are snap-type elements selected from female receiving elements adapted to slidingly receive and engage flexible male elements on the faceplate 200, flexible male elements adapted to slidingly engage female elements in the faceplate, or a combination of both. Preferably, the fastener elements, such as fastener elements 135, in the temporary receiving region 130 are of the same type and arranged as are the fastener elements 125 in the accessory receiving region 120 shown in FIGS. 1 and 2. Most preferably, the fastener elements in the temporary receiving region 130 are identical to the fastener elements 125 in the receiving region 120. It is also preferred that the fastener elements 135 in the temporary receiving region 130 be adapted to readily engage the fastener elements 225 of the faceplate 200. For example, snap-type engagement elements are most preferred so that the accessory can be quickly engaged to the panel at the temporary receiving region 130, and then after painting, can be quickly and easily removed therefrom so that the faceplate can be subsequently installed in the accessory receiving region 120. The fastener elements 225 of the faceplate 200 can be of the same type to engage with the fasteners 125 and 135 previously noted for the receiving regions 120 and 130, respectively of the body panel of interest. Preferably, the fastener elements 225 of the faceplate 200 are snap-type elements selected from female receiving elements adapted to slidingly receive and engage flexible male elements in the region(s) of the panel, flexible male elements adapted to slidingly engage female elements in the region(s) of the panel, or a combination of both.

In addition to eliminating the requirement for painting jigs or other support assemblies for the accessories or faceplates, the present invention temporary engagement provisions on the body panel of interest, can also serve to retain the accessory after painting and during one or more curing operations, Thus, in certain applications, it is contemplated that the accessory may be left temporarily attached to the panel, and then subjected to one or more heating operations or other paint curing stages.

The present invention provides a strategy by which one or more accessories such as faceplates are temporarily attached to a vehicle body panel and then the collection of accessories and panel are painted and optionally subjected to a drying or paint curing operation. Once the accessories can be handled, they are removed from the panel and then installed at their final intended location(s) on the panel. This strategy eliminates the need for separate support structures such as painting jigs to hold the accessories during painting.

It will be appreciated that the present invention can be utilized with respect to nearly any vehicle body panel besides a front bumper face as described herein. For example, the invention can be utilized in conjunction with rear bumper panels, rear quarter panels or fenders, side panels, doors, front quarter panels or fenders, hoods, roof panels, rocker panels, front panels such as grills, rear deck panels such as trunk lids, and any combination of vehicle panels. It is further contemplated that the present invention can be used in conjunction with body panels from vehicles besides automobiles. For example, the invention can be used in associated with panels used in trucks, vans, off-road vehicles, leisure vehicles, recreation vehicles, and the like. And, as previously noted, it will be appreciated that the invention can be used in association with any type of accessory or component that is to be painted and then installed on the vehicle.

Many other benefits will no doubt become apparent from future application and development of this technology.

All patents, published applications, and articles noted herein are hereby incorporated by reference in their entirety.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A vehicle body panel comprising:
  a panel, the panel defining (i) a first region for installation engagement of a removable accessory, the panel including at least one fastener element in the first region adapted to engage a corresponding fastener element of the accessory, and (ii) a second region for temporary engagement of the same removable accessory, the panel including at least one fastener element in the second region adapted to temporarily engage a corresponding fastener element of the removable accessory;
  wherein the fastener elements in the first region of the panel and the second region of the panel are snap-type elements selected from female receiving elements adapted to slidingly receive and engage flexible male elements, flexible male elements adapted to slidingly engage female elements, or combinations thereof.

2. The vehicle body panel of claim 1 wherein the at least one fastener element in the first region is identical to the at least one fastener element in the second region.

3. The vehicle body panel of claim 1 wherein the first region includes a recessed area of the panel.

4. The vehicle body panel of claim 1 wherein the second region includes a recessed area of the panel.

5. The vehicle body panel of claim 1 wherein the panel is a front bumper panel.

6. The vehicle body panel of claim 1 wherein the second region for temporary engagement of the accessory is a region of the panel that is not visible upon final installation of the panel in a vehicle.

7. A vehicle body panel and accessory assembly, the assembly comprising:
  a vehicle accessory including at least one fastener element;
  a vehicle panel defining a first region and a second region, the panel including (i) a first fastener element in the first region adapted for installation engagement with the at least one fastener element of the accessory, and (ii) a second fastener element in the second region adapted for temporary engagement of the at least one fastener element of the same accessory;
  wherein the fastener elements in the first region of the panel and the second region of the panel are snap-type elements selected from female receiving elements adapted to slidingly receive and engage flexible male elements, flexible male elements adapted to slidingly engage female elements, or combinations thereof.

8. The panel and accessory assembly of claim 7 wherein the at least one fastener element of the accessory is selected from the group consisting of female receiving fastener elements, flexible male fastener elements, and combinations thereof.

9. The panel and accessory assembly of claim 7 wherein the accessory is a lighting faceplate.

10. The panel and accessory assembly of claim 7 wherein the at least one fastener element in the first region of the vehicle panel is identical to the at least one fastener element in the second region.

11. The panel and accessory assembly of claim 7 wherein the first region of the vehicle panel includes a recessed area of the panel.

12. The panel and accessory assembly of claim 7 wherein the second region of the vehicle panel includes a recessed area of the panel.

13. The panel and accessory assembly of claim 7 wherein the panel is a front bumper panel.

14. The panel and accessory assembly of claim 7 wherein the accessory is a lighting faceplate and the vehicle panel is a front bumper face.

15. The vehicle body panel of claim 7 wherein the second region of the vehicle panel is a region of the panel that is not visible upon final installation of the panel in a vehicle.

16. A method of supporting an accessory component while painting the component and a vehicle panel to which the component is to be subsequently engaged, the method comprising:

providing a vehicle panel having a first fastener element and a second fastener element, each element adapted to engage an accessory component, the second fastener element located at a region of the vehicle panel different than that of the first fastener element;

providing an accessory component adapted to engage the first and second fastener elements of the vehicle panel;

temporarily engaging the accessory component to the first fastener element of the vehicle panel prior to painting;

painting the vehicle panel and the accessory temporarily engaged thereto;

after painting of the vehicle panel and the accessory component, disengaging the accessory component from the first fastener element of the vehicle panel; and engaging the accessory component to the second fastener element of the vehicle panel.

17. The method of claim 16 wherein the accessory component is a lighting faceplate and the vehicle panel is a front bumper face.

18. The method of claim 16 further comprising:

prior to engaging the accessory component to the second fastener element of the vehicle panel, drying the painted vehicle panel and the accessory.

19. The method of claim 16 wherein the location of the first fastener element on the vehicle panel is a region of the vehicle panel that is not visible upon final installation of the vehicle panel in a vehicle.

20. The method of claim 16 wherein the accessory component includes a plurality of fastener elements for engaging the first and the second fastener elements of the vehicle panel, the plurality of fastener elements of the accessory component all being identical.

* * * * *